March 20, 1956  P. SCHLUMBOHM  2,738,722
COFFEE MAKER
Filed July 27, 1954

INVENTOR.

United States Patent Office 2,738,722
Patented Mar. 20, 1956

2,738,722

COFFEE MAKER

Peter Schlumbohm, New York, N. Y.

Application July 27, 1954, Serial No. 446,088

1 Claim. (Cl. 99—313)

The invention refers to a filter pot, especially for its application as coffee maker or teamaker. The invention is illustrated in the accompanying drawings, Figure 1 and Figure 2, by way of example.

Figure 1:
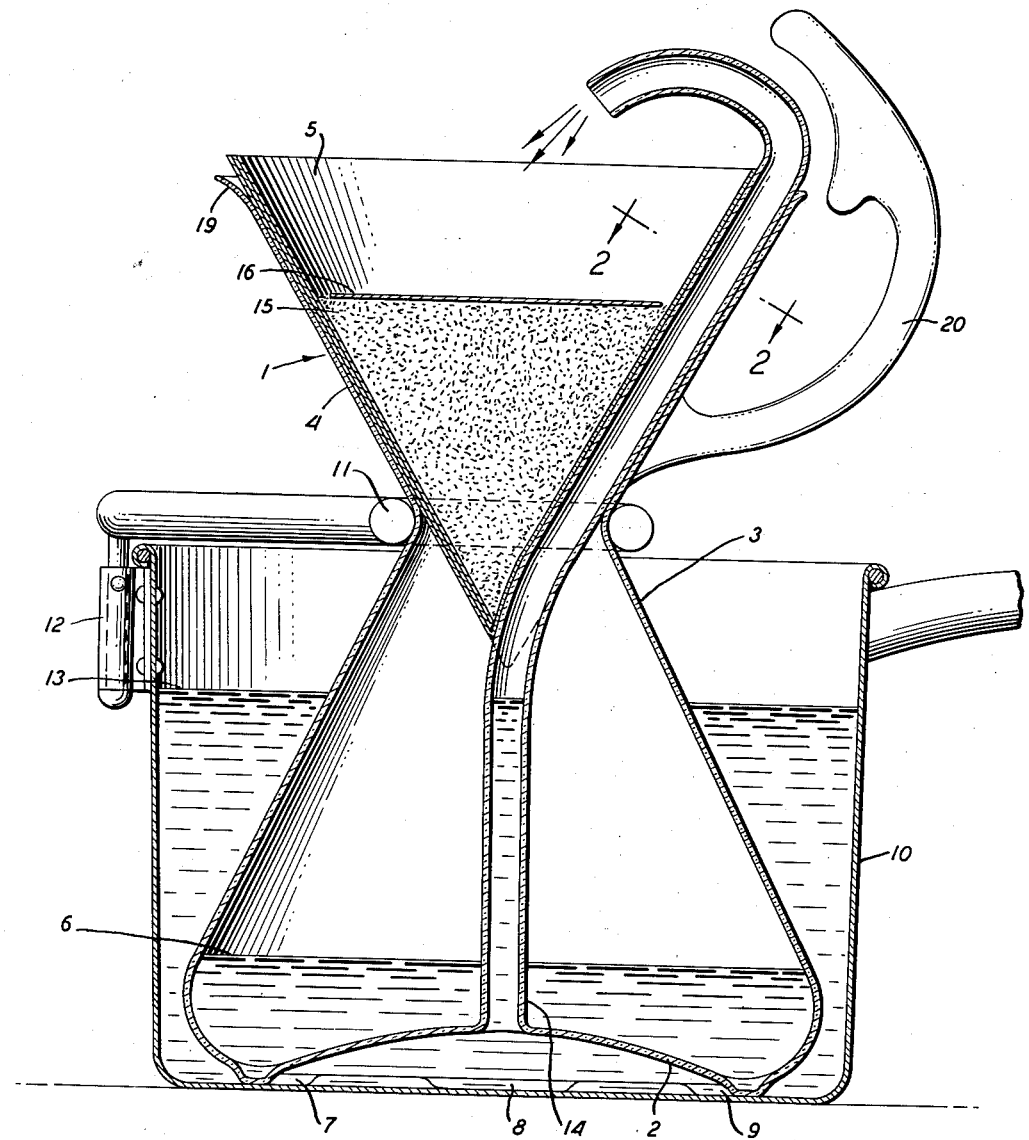

Figure 1 shows the filter pot inserted in a container with boiling water which itself is placed on a stove or equipped with heating means to boil the water. These means are not shown. Figure 1 is a vertical section, except for details shown in view.

Figure 2:
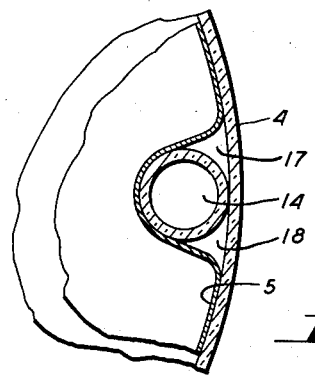

Figure 2 is a section along line 2, 2 of Figure 1.

The filter pot shown in Figure 1 is my Chemex coffee maker, as described in U. S. Patents 2,241,368, 2,359,943, and other U. S. Patents of mine. Such a filter pot 1 is made as one piece with bottom walls 2, side walls 3 and an open top. In the upper section the side walls 4 form a funnel which supports a filtering element such as a filterpaper cone 5. The lower section receives the filtrate 6, meaning the filtered coffee or the filtered tea. The bottom walls are equipped with three ridges 7, 8, 9 to allow a water circulation under the bottom walls 2. The water boiler 10 is equipped with a clamp 11 which is mounted with a swivel base 12 at the walls of the water container 10. This arrangement allows to fixate the coffee maker 1 within the boiling water 13 to counteract buoyancy.

Following the invention, the filter pot 1 is equipped with a geyser-tube 14 which is inserted, preferably in the center of the bottom wall 2. This means that boiling water 13 from the zone below the bottom wall 2 of the filter pot can be lifted in percolator fashion and will leave the geyser-tube 14 as shown by the arrows and will flow into the filter cone 5, the lower section of which is filled with coffee 15 to be leached.

As an inventive step, I found that it is very advantageous to place a disc 16 of filterpaper on top of the coffee grounds. This disc will serve as a distributor for the water and is discarded with the coffee grounds when they are lifted out together wtih the filterpaper cone 5.

While in this invention the technique of "perking" is applied, the great difference compared with conventional percolators is that the filtrate does not recirculate.

The arrangement furthermore has the advantage that the coffee 6 is kept hot in a water-bath arrangement.

A specific advantage of this construction as shown in Figure 1 and Figure 2 is that the tube 14, by spacing the filterpaper 5 away from the wall 4 of the filter pot, offers venting channels 17, 18, through which air can escape from the lower section of the filter pot when displaced by the filtered coffee 6. In the one-piece construction of a filter pot like Chemex, venting is a great problem and the presently shown venting means constitute a new and simple possibility. A pouring lip 19 and a handle 20 complement the equipment. The handle is designed to extend upwardly and inwardly to serve as a shield.

I claim as my invention:

Coffee maker having a bottom wall integral with the side walls of a bottom section, with the side walls of a center section and with the side walls of a top section and an open top; the side walls of the top section and of the center section forming a funnel to support a coffee holding conical filter element made from flexible material, and the side walls of the bottom section together with the bottom wall walling the space for the filtered coffee; characterized by a geyser tube adapted to lift and to direct boiling water onto the coffee grounds above the filter element, said geyser tube being joined to the bottom wall which it penetrates and ascending within the coffee maker in close proximity to the side walls of the top section, whereby the flexible filter element will be spaced by the tube from said side walls and channels will be kept open to vent the space of the filtrate towards the open top of the coffee maker.

References Cited in the file of this patent

UNITED STATES PATENTS

| | | |
|---|---|---|
| 544,140 | Van Deusen | Aug. 6, 1895 |
| 1,083,900 | Brown | Jan. 6, 1914 |
| 1,335,048 | Diefendorf | Mar. 30, 1920 |
| 1,655,014 | Herring | Jan. 3, 1928 |
| 1,843,241 | Pouget | Feb. 2, 1932 |
| 1,882,140 | Haines | Oct. 11, 1932 |
| 2,359,943 | Schlumbohm | Oct. 10, 1944 |

FOREIGN PATENTS

| | | |
|---|---|---|
| 323,313 | Germany | Aug. 5, 1919 |
| 703,612 | Germany | Mar. 12, 1941 |